(12) United States Patent
Nakamura et al.

(10) Patent No.: US 6,742,676 B2
(45) Date of Patent: Jun. 1, 2004

(54) POURING VESSEL

(75) Inventors: Hiroyuki Nakamura, Tokyo (JP); Masashi Yoneyama, Matsudo (JP); Takayuki Goto, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 10/381,276

(22) PCT Filed: Aug. 30, 2002

(86) PCT No.: PCT/JP02/08786
§ 371 (c)(1),
(2), (4) Date: Mar. 24, 2003

(87) PCT Pub. No.: WO03/018426
PCT Pub. Date: Mar. 6, 2003

(65) Prior Publication Data
US 2003/0226856 A1 Dec. 11, 2003

(30) Foreign Application Priority Data

Aug. 31, 2001 (JP) .......................... 2001-264509
Aug. 31, 2001 (JP) .......................... 2001-264857

(51) Int. Cl.⁷ .................... B65D 77/06; B65D 35/28; B65D 25/16
(52) U.S. Cl. ................ 222/95; 222/94; 222/96; 222/105; 222/107; 222/209; 222/212; 222/215; 222/386.5
(58) Field of Search ............... 222/94–96, 105–107, 222/209, 212–215, 386.5, 389

(56) References Cited

U.S. PATENT DOCUMENTS

| | | | | |
|---|---|---|---|---|
| 4,574,987 A | * | 3/1986 | Halligan et al. | 222/107 |
| 4,585,149 A | * | 4/1986 | Zulauf | 222/94 |
| 4,760,937 A | * | 8/1988 | Evezich | 222/95 |
| 5,275,311 A | * | 1/1994 | Piarrat | 222/209 |
| 5,332,121 A | * | 7/1994 | Schmidt et al. | 222/95 |
| 5,526,957 A | * | 6/1996 | Brown et al. | 222/94 |
| 5,800,653 A | * | 9/1998 | Keller | 156/203 |
| 6,364,163 B1 | * | 4/2002 | Mueller | 222/83 |
| 6,460,739 B1 | * | 10/2002 | Norris et al. | 222/380 |
| 2003/0089735 A1 | * | 5/2003 | Iwatsubo | 222/95 |
| 2004/0011810 A1 | * | 1/2004 | Mita et al. | 222/105 |

FOREIGN PATENT DOCUMENTS

| | | |
|---|---|---|
| JP | U 3-20223 | 2/1991 |
| JP | A 4-115114 | 4/1992 |
| JP | A 9-249258 | 9/1997 |
| JP | A 2000-16459 | 1/2000 |

* cited by examiner

Primary Examiner—J. Casimer Jacyna
(74) Attorney, Agent, or Firm—Oliff & Berridge, PLC

(57) ABSTRACT

In this invention there is provided a pouring vessel of the squeezable, delaminated bottle type, which can be squeezed smoothly to the last moment of discharge operation so that little content remains in the vessel. The vessel or container of a delaminated bottle type comprises the outer shell layer that forms a squeezable outer container and the inner layer that forms an inner container for receiving its content inside and capable of being deflated and deformed inward with the decrease in inner pressure; and the container is also provided with a discharge cap. In this configuration, a pair of vertically extending adhesive resin strips is formed by adhering the outer shell layer and the inner layer over the roughly entire height of the container. The relationship of the peripheral length between the two adhesive resin strips to the width of each strip is determined to give such a range that the inner container can be almost completely deflated and deformed. In the case of the container having the body of an elliptical shape, the adhesive resin strips are disposed at both ends of the long axis of the body, axisymmetrically on the central axis, with each strip being divided by the long axis into right and left parts having different lengths in the width direction.

6 Claims, 15 Drawing Sheets

POURING VESSEL

TECHNICAL FIELD

This invention relates to a pouring vessel made of synthetic resins, which has been obtained by laminating an inner container capable of being deflated and a squeezable outer container in a peelable manner, so as to enable the content to be discharged and used repeatedly without sucking up outside air into the inner container.

BACKGROUND OF THE INVENTION

Utility models laid open No. 1982-44063 and No. 1995-22951 describe prior-art pouring vessels of the squeezable type, which comprise an inner container and an outer container in which to put the inner container.

The prior art described in utility model laid open No. 1982-44063 refers to a pouring vessel comprising an inner container and an outer squeezable container having an air hole at the bottom. Mayonnaise is discharged from the inner container by squeezing the outer container. Then, outside air is introduced into the void between the outer container and the inner container. At that time, the inner container maintains its deformed shape, while the outer container returns to the original shape because of its restoring force.

The prior art described in utility model laid open No. 1995-22951 refers to another pouring vessel comprising an inner container and an outer squeezable container combined and fitted to each other. The inner container is provided with the first check valve that permits the content to pass through the valve and come out of the inner container but does not permit outside air to enter the inner container. The outer container is provided with the second check valve that permits outside air to enter the void between both containers, but does not permit air to escape from the void.

The method of utilizing a pair of adhesive resin strips is also generally in use. These adhesive resin strips adhere and fix the outer container and the inner container to each other over the entire height of the containers and keep the deflationary deformation of the inner container at a certain shape that gives no shrinkage in the height direction, thereby ensuring the flow path for the content and making the discharging operation smooth.

In order for the adhesive resin strips such as described above to fulfill their function, a simple and effective method is to dispose the pair of adhesive resin strips at axisymmetric positions on the central axis of the body. But there arises a problem here concerning their width. If the width is too wide, the inner container cannot be deflated fully. If the width is too narrow, the content flow path is blocked because of deflationary deformation that takes place in an early period of discharge. As a result, no smooth discharging operation is obtained, and thus, a significant amount of content is left unused in the inner container.

This invention has been made to solve such a problem found in prior art. The object of this invention is thus to provide a pouring vessel of the squeezable type that has a high discharging ability and is capable of minimizing the remaining volume of the content.

From a design point of view, the bodies of many containers now in use have an elliptical cross-section rather than the circular one. An important point in this case is where the adhesive resin strips are positioned. If a pair of adhesive resin strips is disposed at both ends of assumed long axis, axisymmetrically on the central axis of the body, then deflationary deformation proceeds almost symmetrically in the unadhering portions of the inner container divided into two portions by the adhesive resin strips. Stable discharge operation can be secured under this arrangement.

However, even though the adhesive resin strips are disposed at the above-described positions in the cross-section of the body having an elliptical shape rather than a circular one, there arises a problem concerning their width. If the adhesive resin strips have too wide a width to ensure a flow path for the content, any deformable portion disappears under the condition that the inner container has deformed to a considerable extent due to the decrease in the volume of the content. Eventually, both ends of each adhesive resin strip resist the pressure caused by the squeeze. In this state, further discharge becomes difficult in spite of a significant volume of the content remaining in the inner container.

This invention also has been made to solve such a problem found in prior art. Another object of this invention is thus to provide a pouring vessel of the squeezable type having an elliptical shape, which can be smoothly squeezed to the last moment of the discharging operation and is capable of minimizing the remaining volume of the content.

DISCLOSURE OF THE INVENTION

Among the means of solving the above-described technical problem, the means of carrying out the invention of claim 1 has the following configuration. The pouring vessel comprises:

a blow-molded, bottle-like container consisting of an outer shell layer and an inner layer, which are peelably laminated together, and having a body of a cross-sectional shape in which an assumed symmetrical long axis and a symmetrical short axis are orthogonal with each other, said outer shell layer forming an outer container, which has the flexibility to make this container squeezable and recoverable to its original shape, and said inner layer forming an inner container for receiving its content inside and capable of being deflated and deformed inward with the decrease in inner pressure; and a discharge cap having an opening and attached to neck of the container.

In this configuration, a pair of adhesive resin strips is formed at both ends of the long axis of the body, axisymmetrically on the central axis, by adhering the outer shell layer and the inner layer over the roughly entire height of the container, and the width (La) of this adhesive resin strips is set in the range of $0.8(\frac{1}{4})(L-2D1)$ to $1.2(\frac{1}{4})(L-2D1)$, preferably at $(\frac{1}{4})(L-2D1)$, wherein D1 is the length of the long axis in the cross-section of the body (2); and L is the peripheral length in the cross-section of the body.

The discharge cap is provided with the first check valve mechanism that prevents the back flow of the content from the opening to the inner container and also prevents the inflow of outside air. The outer container is equipped with an outside air introduction mechanism for introducing outside air into the interlaminar void between the outer shell layer and the inner layer, with the outside air introduction mechanism being connected to the second check valve mechanism, which has a function to confine air within the void at the time of squeeze.

In the invention of claim 1, the pouring vessel is squeezed to discharge the content. When the squeeze is stopped and the pressure is released, the outer container begins restoring its original shape because of its resilient, restoring force. At the same time, the first check valve mechanism provided in the discharge cap is in action to stop the discharge of the content and to prevent the back flow of the content and the inflow of outside air into the inner container. Since the inner container remains deformed with the decrease in the volume of content, outside air is introduced into the void between the outer shell layer and the inner layer through the air introduction mechanism, and the outer container is restored to its original shape.

If the pouring vessel is squeezed again in the state in which the outer container has been restored to its original shape, air in the void is pressurized by the squeeze because the second check valve mechanism seals the void. Thus, a pressure is applied on the inner container to discharge the content further.

Since the first check valve mechanism prevents the inflow of outside air into the inner container, there is no airspace in the inner container. The content is thus always located in front of the opening. No matter what position the pouring vessel takes when it is used, the content can be discharged easily. It is also possible to prevent the content from being decomposed or deteriorated caused by air oxidation.

With the formation of vertical adhesive resin strips, a pair of unadhering portions of the inner layer (hereinafter referred to as unadhering inner layers) is also formed. As the pouring vessel is squeezed and the content is discharged, these unadhering inner layers are deformed. This deformation proceeds in the following manner. When the deformation is observed on the cross-section of the body in the drawing having the vertical long axis, the right and left unadhering inner layers deform first at their central portion in the flattening direction. As the deformation further proceeds, the right and left unadhering inner layers come in contact with each other roughly on the long axis. This portion of contact extends toward the adhesive resin strips disposed at both ends of the long axis. Ideally, the inner container is deflated axisymmetrically on both of the long and short axes.

As the content is further discharged, the inner container continues its deflationary deformation until there remains little content in the inner container. At that time, the portion of contact extends over the entire long axis, and the inner container is almost completely in a flat state on the cross-section. If under this condition, the length of the unadhering inner layers is set at a sum of the length of the long axis and the width of each adhesive resin strip on the cross-section of the body, or more specifically, if the width of each adhesive resin strip is set at a length equal to $(¼)(L-2D1)$, then the inner container becomes almost completely flat as soon as discharge of the content is completed.

However, depending on the condition of use, the unadhering inner layers are not deflated axisymmetrically on both the long and short axes, but something asymmetric or partially loose may occur, and deflationary deformation cannot lead the inner container to become completely flat. In such a case, it is preferred to set the width of the adhesive resin strips at a value slightly less than $(¼)(L-2D1)$.

If the content has high viscosity, it may be preferred in some cases to set the width of the adhesive resin strips at a value slightly wider than $(¼)(L-2D1)$ so as to secure a larger flow path than usual and to maintain a smooth content-discharging operation.

Various tests were conducted under the above-described conditions and for the purposes of use. It has been found that a width in the range of $0.8(¼)(L-2D1)$ to $1.2(¼)(L-2D1)$ gives good results that only quite a small amount of the content remains in the inner container after the use and that the discharging operation can be smooth to the last moment of squeeze.

If the width of the adhesive resin strips is set at a value wider than $1.2(¼)(L-2D1)$, the deformable portion practically disappears in the state in which a fair amount of the content has remained still in the inner container, because of a dimensional limitation on the cross-sectional length of the unadhering inner layers. In this case, the unadhering inner layers on both sides of the adhesive resin strips are so stretched at four ends of the adhesive resin strips in the width direction (hereinafter referred to as strip ends) that it is difficult to deflate and deform these layers any more. In this state, no matter how the outer container is squeezed, it is hard to discharge the content.

If the width of the adhesive resin strips is set at a value narrower than $0.8(¼)(L-2D1)$, the unadhering inner layers have a larger cross-sectional length than necessary. Even if a considerable amount of content still remains in the entire inner container, there is a fear that the cross-sectional shape of the inner container almost blocks the flow path at a place where the content tends to get smaller, depending on the conditions of discharge from, or of storage in, the vessel. In this state, smooth discharge of the content is no longer possible.

The means of carrying out the invention of claim 2 exists in the configuration that, in the invention of claim 1, the body has a circular cross-section in which the length of the long axis is made equal to that of the short axis.

Due to the configuration of claim 2, the residual amount of the content can be reduced in the vessel having the body of a circular cross-section, while steadily maintaining favorable discharging operation. It is also possible to discharge more content in a single squeeze from the vessel with a circular cross-section than from the vessel with an elliptical cross-section, because each stroke of squeeze deformation can be enlarged for discharging the content.

The means of carrying out the invention of claim 3 has the following configuration. The pouring vessel comprises:

a blow-molded, bottle-like container consisting of an outer shell layer and an inner layer, which are peelably laminated together, and having a body of a cross-sectional shape in which an assumed symmetrical long axis and a symmetrical short axis are orthogonal with each other, said body comprising an outer shell layer that forms an outer container, which has the flexibility to make this container squeezable and recoverable to its original shape, and said body also comprising an inner layer that forms an inner container for receiving its content inside and capable of being deflated and deformed inward with the decrease in inner pressure; and a discharge cap having an opening and attached to neck of the container.

In this configuration, a pair of adhesive resin strips is formed at both ends of the long axis of the body, axisymmetrically on the central axis, by adhering the outer shell layer and the inner layer over the roughly entire height of the container, with each strip being divided by the long axis into right and left parts having different lengths in the width direction.

The discharge cap is provided at the opening with the first check valve mechanism that prevents the back flow of the content to the inner container and also prevents the inflow of outside air. The outer container is equipped with an outside air introduction mechanism for introducing outside air into the interlaminar void between the outer shell layer and the inner layer, with the outside air introduction mechanism being connected to the second check valve mechanism, which has a function to confine air within the void at the time of squeeze.

In the invention of claim 3, the pouring vessel is squeezed to discharge the content. When the squeeze is stopped and the pressure onto the body is released, the outer container begins restoring its original shape because of its resilient, restoring force. At the same time, the first check valve mechanism provided in the discharge cap is in action to stop the discharge of the content and to prevent the back flow of the content and the inflow of outside air into the inner container. Since the inner container remains deformed with the decrease in the volume of content, outside air is introduced into the void between the outer shell layer and the inner layer through the air introduction mechanism, and the outer container is restored to its original shape.

If the pouring vessel is squeezed again in the state in which the outer container has been restored to its original shape, air in the void is pressurized by the squeeze because the second check valve mechanism seals the void. Thus, a pressure is applied on the inner container to discharge the content further.

Since the first check valve mechanism prevents the inflow of outside air into the inner container, there is no airspace in the inner container. The content is thus always located in front of the opening. No matter what position the pouring vessel takes when it is used, the content can be discharged easily. It is also possible to prevent the content from being decomposed or deteriorated caused by air oxidation.

With the formation of vertical adhesive resin strips, a pair of unadhering inner layers is also formed. As the pouring vessel is squeezed and the content is discharged, these unadhering inner layers are deformed. This deformation proceeds in the following manner. When the deformation is observed on the cross-section of the body in the drawing having the vertical long axis, the right and left unadhering inner layers depressingly deform first at their central portions. As the deformation further proceeds, the right and left unadhering inner layers come in contact with, and push themselves against, each other roughly on the long axis. The deflationary deformation proceeds in such a way that this portion of contact extends toward the adhesive resin strips disposed at both ends of the long axis.

As the content is further discharged and deflationary deformation goes on, the deformable portion practically disappears because of a dimensional limitation on the cross-sectional length of the unadhering inner layers. If the right and left parts of the adhesive resin strips divided by the long axis have the same width, the inner container to be deflated is born at four strip ends of these adhesive resin strips so that it is difficult to deflate and deform the unadhering inner layers any more. In this state, no matter how the outer container is squeezed, it is hard to discharge the content.

In this invention, however, the right and left parts divided by the long axis have different lengths in the width direction. Even if the deflationary deformation proceeds in the same way, the shorter part of each adhesive resin strip allows for more deflationary deformation than the longer part does. Therefore, these strip ends put no obstacle in the process of deflationary deformation.

Near the ends of longer parts of the adhesive resin strips divided in two parts by the long axis, the deformable portion practically disappears because of a dimensional limitation on the cross-sectional length of the unadhering inner layers. The pressure caused by the squeeze is held at these ends. On the other hand, there still is dimensional extra space near the ends of the shorter parts of the adhesive resin strips. The content can be discharged until no deflationary deformation is possible on the sides of the shorter parts of the adhesive resin strips. Thus, the remaining content can be minimized to a large extent.

The means of carrying out the invention of claim 4 exists in the configuration that, in the invention of claim 3, the body has an elliptic cross-section.

As the cross-sectional shapes in which the assumed symmetrical long axis and the symmetrical short axis are orthogonal with each other, there are ellipse, ellipsoid, and flat diamond. In the case of an elliptic shape, the diameter changes gradually from the direction of long axis to the direction of short axis, without giving any bending point to the circumference. It is possible, therefore, to proceed with the deflationary deformation of the unadhering inner layers much more stably and to blow-mold the inner container easily.

Means of carrying out the invention of claim 5 includes the invention of claim 3 or 4, and also comprises that each adhesive resin strip is divided by the long axis into the right and left parts, which have widths at a ratio in the range of 10:1 to 10:6.

The above configuration of claim 5 allows for most efficient discharge operations and minimizes the remaining volume of content. If this ratio of right to left part came close to the symmetrical state, or if the ratio were at 10:6 or more, then the effect of asymmetry would not work remarkably. If the ratio were 10:1 or less, the deflationary deformation of the unadhering inner layers would not go on smoothly.

BRIEF DESCRIPTION OF THE DRAWINGS

Like FIG. 14.

PREFERRED EMBODIMENTS

Figure 1:
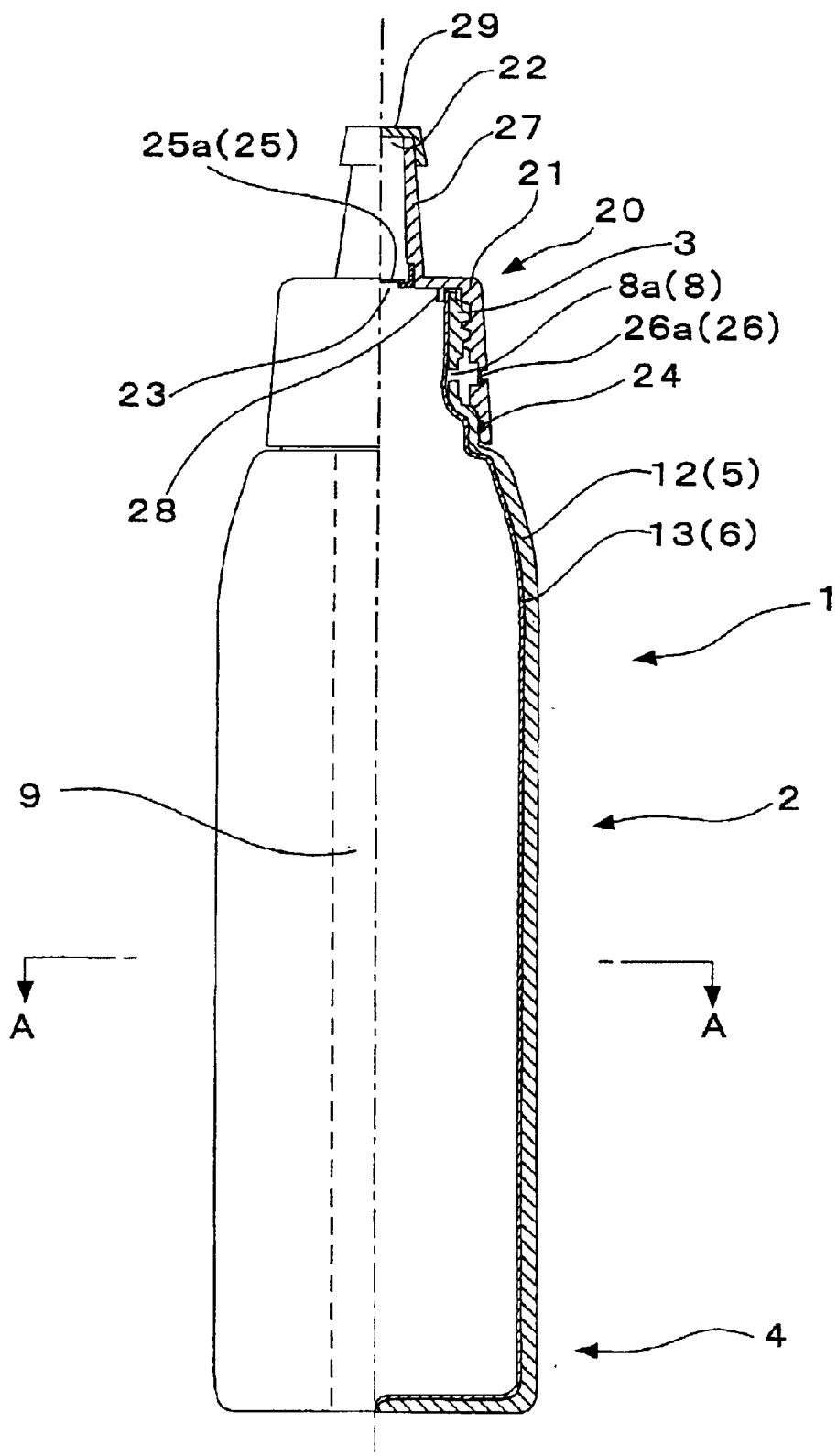
FIG. 1 is a side elevational view showing the pouring vessel in the first embodiment of this invention, with the right half being illustrated in longitudinal section.

This invention is further described with respect to preferred embodiments, now referring to the drawings. FIGS. 1–6 show the first embodiment of the pouring vessel according to this invention. The container 1 comprises an outer shell layer 5 of a low-density polyethylene resin, an inner layer 6 of a nylon resin that has no compatibility with the low-density polyethylene resin, and adhesive resin strips 9 of an adhesive resin that has full adhesiveness with both of the low-density polyethylene and the nylon.

The bottle-like container 1 comprises the bottom 4, the body 2 having an elliptical cross-section and connected to the bottom 4, and the cylindrical neck 3 disposed on the upper end of the body 2 and having screw thread notched around the outer surface of the neck 3.

The container has a height of 160 mm. The body 2 has an elliptic cross-section in which the long axis has a length of 70 mm and the short axis has a length of 40 mm (in the bore diameters for both axes).

The outer shell layer 5 and the inner layer 6, which make up the container 1, are laminated peelably except for the portions adhered and fixed with the adhesive resin strips 9. The outer shell layer 5 forms the outer container 12 having a sufficient mechanical strength and the flexibility to make this container squeezable and recoverable to its original shape. Laid inside the outer container 12, the inner layer 6 forms an inner container 13 that is thin enough to be fully deflated.

Figure 2:
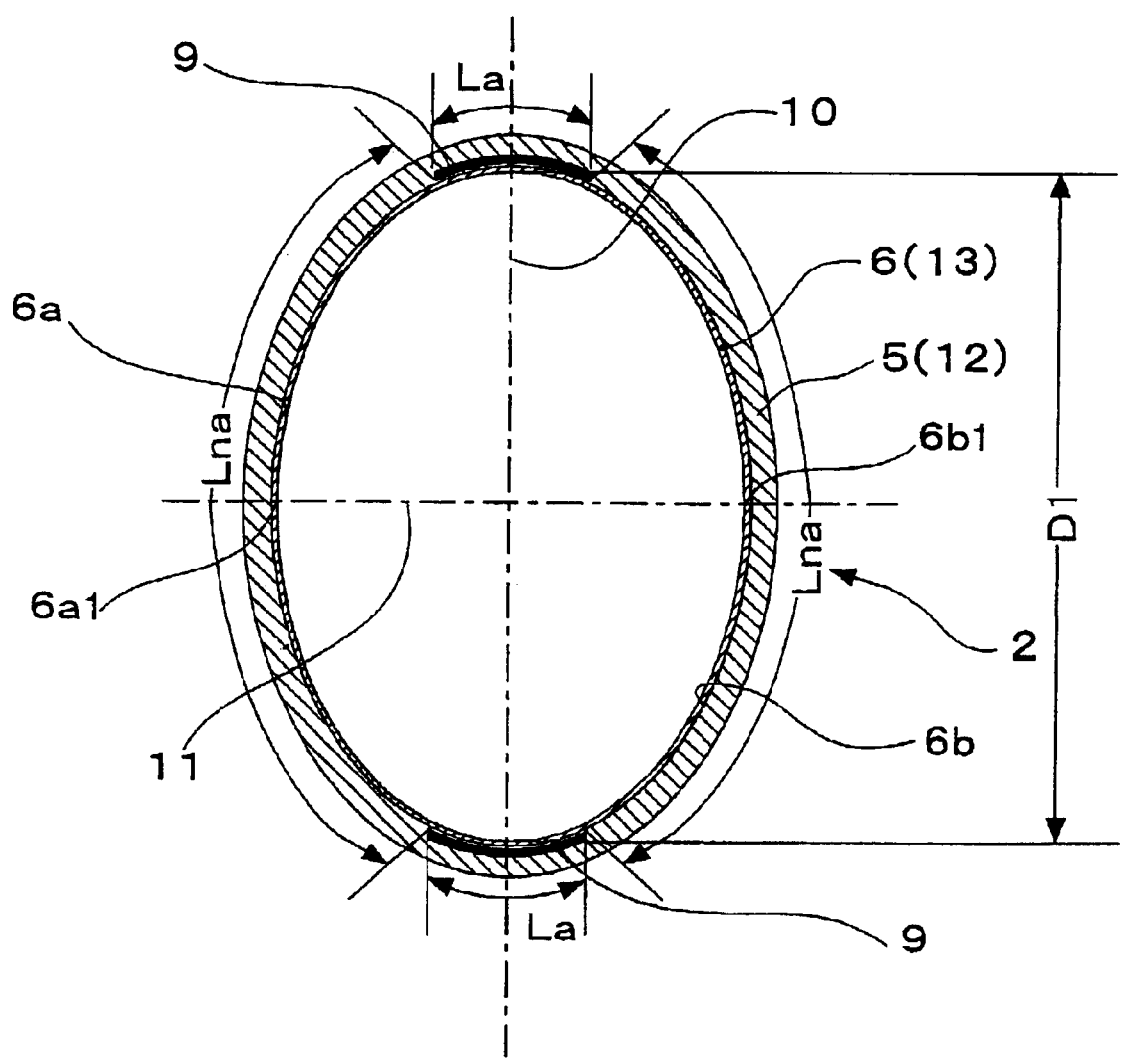
FIG. 2 is a cross-sectional plan view, taken from the line A—A, of the first embodiment shown in FIG. 1.
Figure 3:
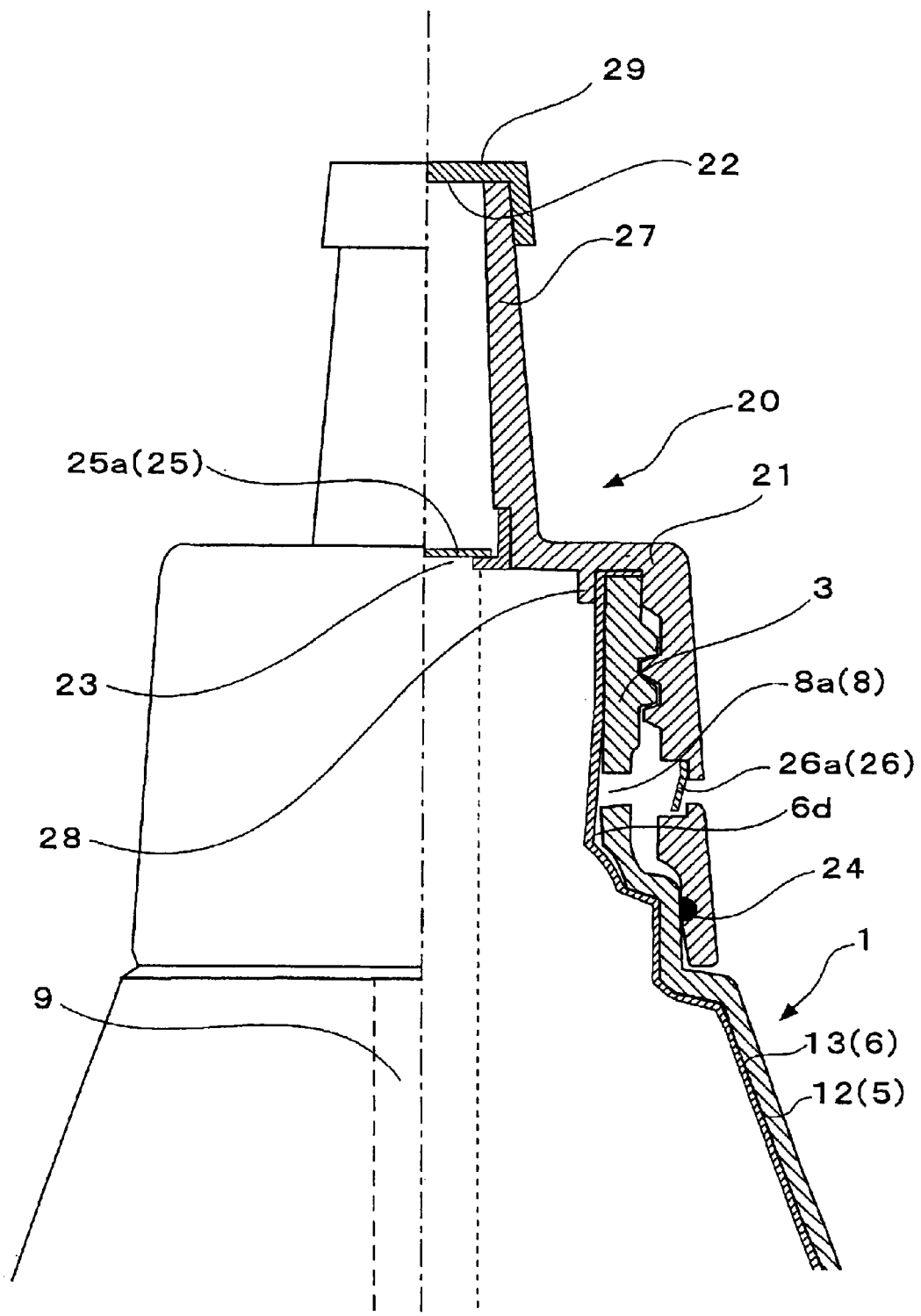
FIG. 3 is a partially enlarged side elevational view showing the first embodiment of FIG. 1, with the right half being illustrated in longitudinal section.

FIG. 2 shows a cross-sectional plan view of the body 2. A pair of adhesive resin strips 9 is disposed at positions opposite to each other at both ends of the long axis 10 in the elliptical cross-section of the body 2, axisymmetrically on the central axis, and extends vertically over the entire height of the container 1, to adhere and fix the outer shell layer 5 and the inner layer 6. In this embodiment, the body has a peripheral length, L, of 176 mm. The width of each adhesive resin strip is set at 9 mm, as calculated from (¼)(L−2D1). The unadhering inner layers have a length, Lna, of 79 mm.

Figure 4:
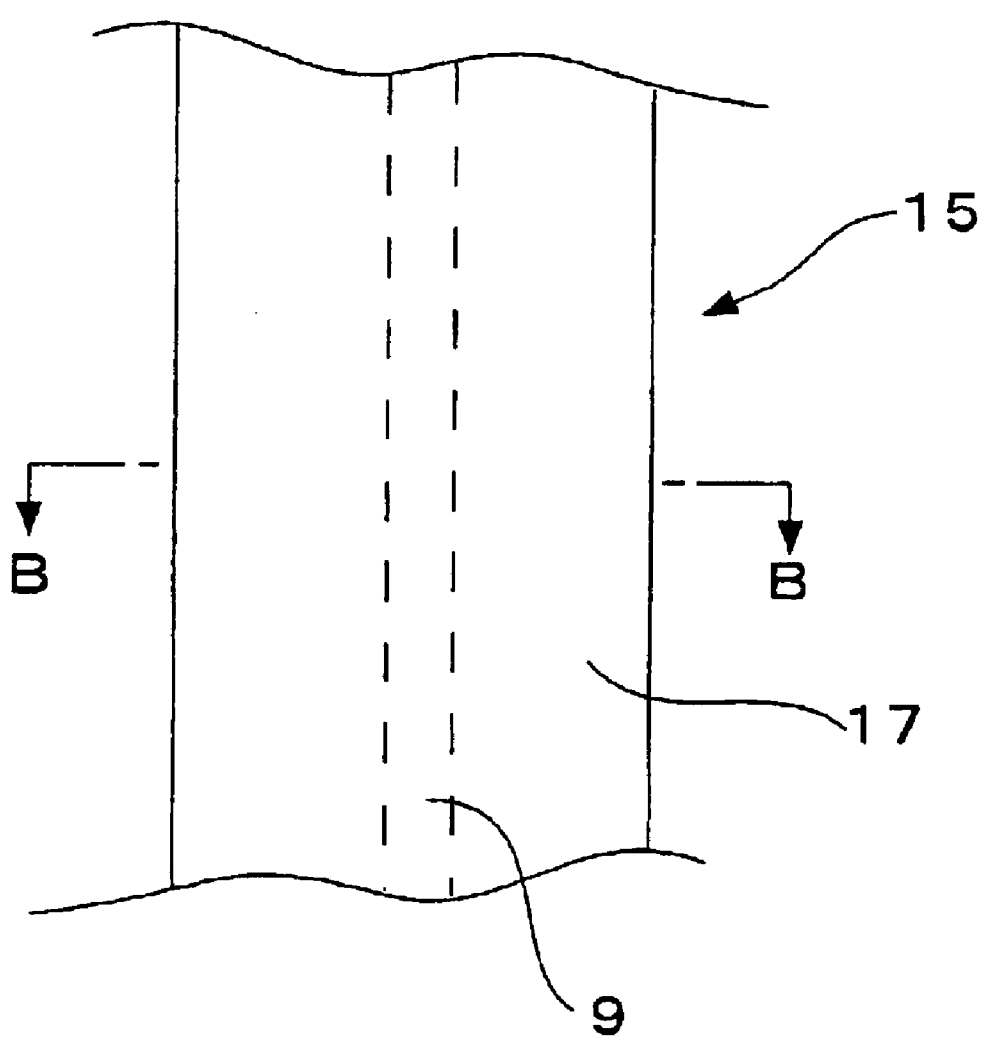
FIG. 4 is a front elevational view showing an example of parison to be blow-molded into the container of the pouring vessel in the first embodiment of this invention.
Figure 5:
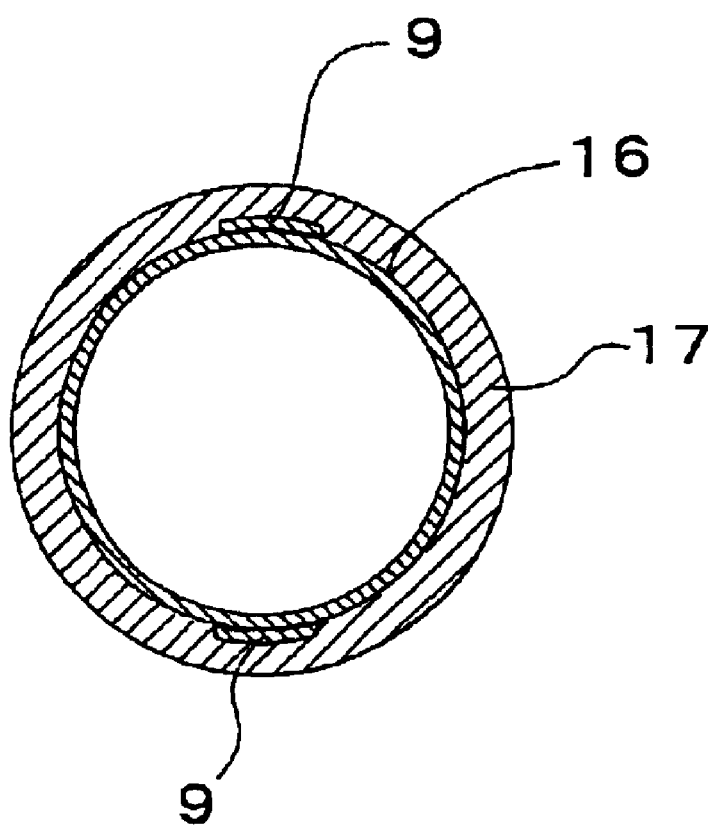
FIG. 5 is a cross-sectional plan view, taken from the line B—B, of an example of the parison shown in FIG. 4.

As shown in FIGS. 4 and 5, parison 15 is first molded by extruding together an outer cylinder 17, an inner cylinder 16 located inside the outer cylinder 17, and a pair of adhesive resin strips 9 positioned axisymmetrically on the central axis, with each strip 9 being sandwiched between the outer cylinder 17 and the inner cylinder 16. This parison 15 is then blow-molded into the container 1, by using a split mold for blow molding.

The cylindrical neck 3 has screw thread notched on the outer wall and is provided with a pair of air introduction ports 8a as a part of the air introduction mechanism 8. These ports 8a are disposed axisymmetrically on the central axis of the container 1 at positions of 90 degrees from the adhesive resin strips 9 (See FIG. 3).

The discharge cap 20 comprises a main cap portion 21 and a discharge cylinder 27. The main cap portion 21 has a top surface through which an opening 23 is provided at the center and has screw thread notched on the inner wall to screw together with the neck 3 of the container 1. The discharge cylinder 27 is disposed on the top surface of the main cap portion 21, and stands upright on the edge of the opening 23. The content is discharged outside from the discharge port 22 at the upper end of the discharge cylinder 27. Cover cap 29 covers the discharge port 22.

The discharge cap 20 is screwed on the neck 3 of the container 1. It comprises a seal guide 28, which hangs down from under the top surface of the main cap portion 21, and also a sealing portion 24, which is disposed at the lower end of the inner wall of the main cap portion 21. The discharge cap 20 is tightly fitted around the container 1 as the seal guide 28 and the sealing portion 24 are in tight contact with the upper end of the inner wall and the lower end of the outer wall, respectively, of the neck 3 of the container 1.

The discharge cap 20 is provided with the first check valve mechanism 25 including the first check valve 25a at the opening 23 of the main cap portion 21. This valve usually has a checking function to close the opening 23 and to prevent outside air from coming in the inner container 13. When the container 1 is squeezed to discharge the content 7, the valve acts to open the opening 23 due to the inner pressure of the inner container 13.

In addition, the discharge cap 20 is provided with the second check valve mechanism 26 comprising the second check valve 26a at places opposite to the air introduction ports 8a disposed in the neck 3. This second check valve 26a has a function to open the ports 8a and introduce air into the void 6d between the outer shell layer 5 and the inner layer 6 through the air introduction ports 8a if the air in the void 6d between the outer container 12 and the inner container 13 has a lower pressure than outside air. On the other hand, if the air in the void 6d has a pressure equal to outside air pressure, the check valve 26a performs the check function to close the ports 8a and prevent air from escaping outside.

The pouring vessel in the above-described embodiment of this invention is further described for its state of use. When the pouring vessel in the above-described configuration is used, the container 1 is squeezed at first, and this squeeze closes the second check valve 26a. The pressure rises in the inner container 13, which contains the content 7, and opens the first check valve 25a. As a result, the content 7 is discharged outside through the discharge port 22 at the tip of discharge cap 20. The inner container 13 deflates and deforms in response to a decrease in the volume of the content 7.

Then, when the squeeze of the container 1 is stopped to release the pressure applied onto the body 2, the outer container 12 begins restoring its original shape because of its resilient, restoring force, and the air in the void between the outer container 12 and the inner container 13 has a reduced pressure. As a result, the pressure inside the inner container 13 returns to atmospheric pressure, and the first check valve 25a closes, thus allowing the discharge of the content 7 to come to a halt.

As the recovery to the original shape of the outer container 12 goes on, the inner container 13 remains deflated because the first check valve 25a is at the closed position, and the pressure of air in the void 6d becomes lower than outside air pressure. Then, the second check valve 26a opens, and outside air is sucked into the void 6d between the outer shell layer 5 and the inner layer 6 through the air introduction ports 8a, while letting the detachment proceed between these layers, until the outer container 12 is restored to its original shape and the air between the outer container 12 and the inner container 13 has a pressure equal to outside air pressure. With the completion of this suction, the second check valve 26a closes.

When the container 1 is squeezed again, the increased pressure caused by the squeeze is transmitted to the inner container by way of air between the outer container 12 and the inner container 13 since the second check valve 26a remains closed. Then, the pressure rises within the inner container 13, the first check valve 25a opens, and the content 7 is discharged from the discharge port 22. The inner container 13 is further deflated with the decrease in the volume of the content 7.

Each time when the squeeze of the container 1 is stopped to release the pressure applied onto the body 2, a new round of the above-described operation is ready to be repeated. The content 7 is thus discharged again and again by repeating the squeeze operations until little content 7 remains in the inner container 13.

Figure 6:
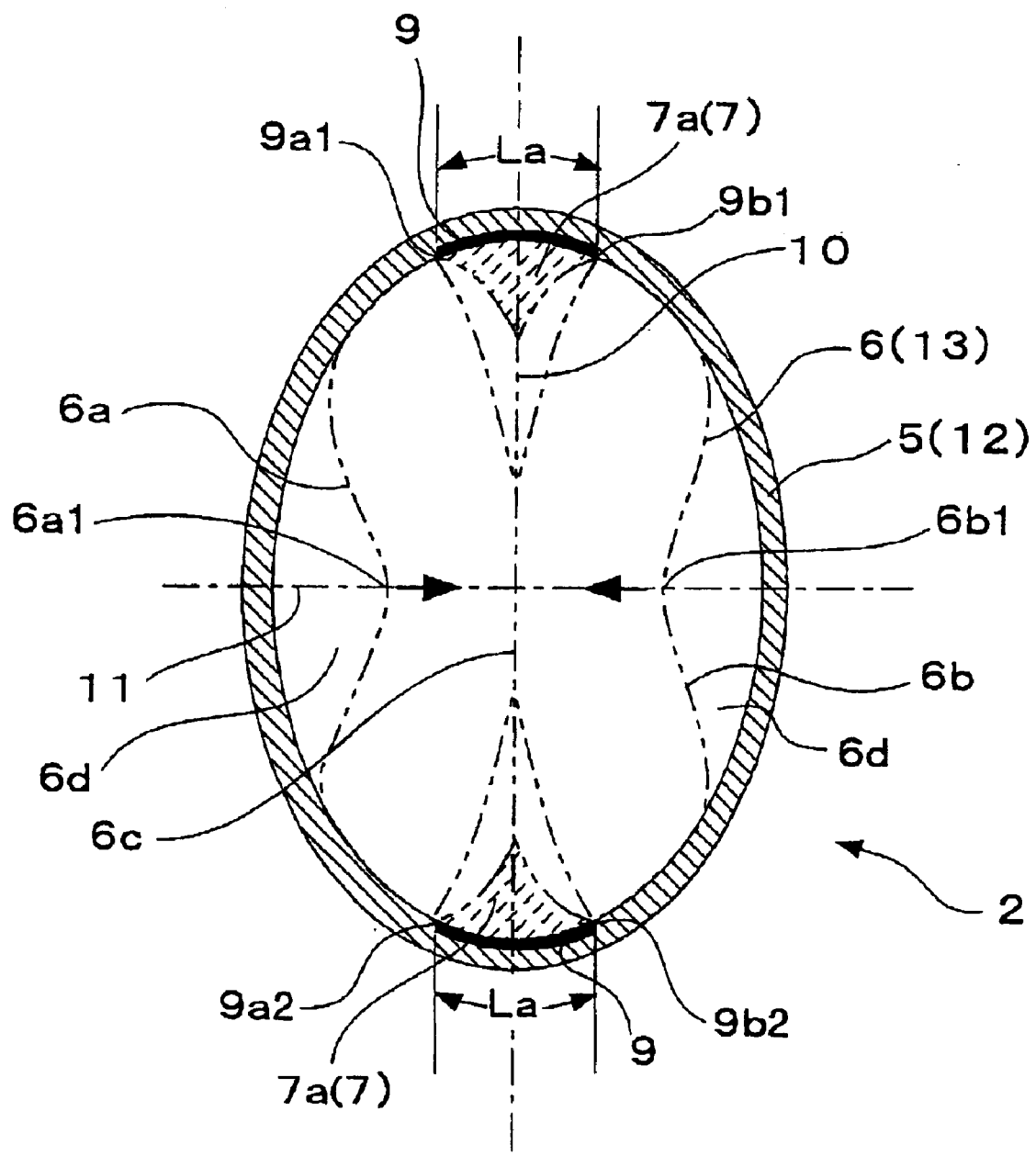
FIG. 6 is an explanatory drawing that shows the trend in the deformation of the inner container in the first embodiment of the pouring vessel of this invention illustrated in the cross-sectional plan view of FIG. 2.
Figure 7:
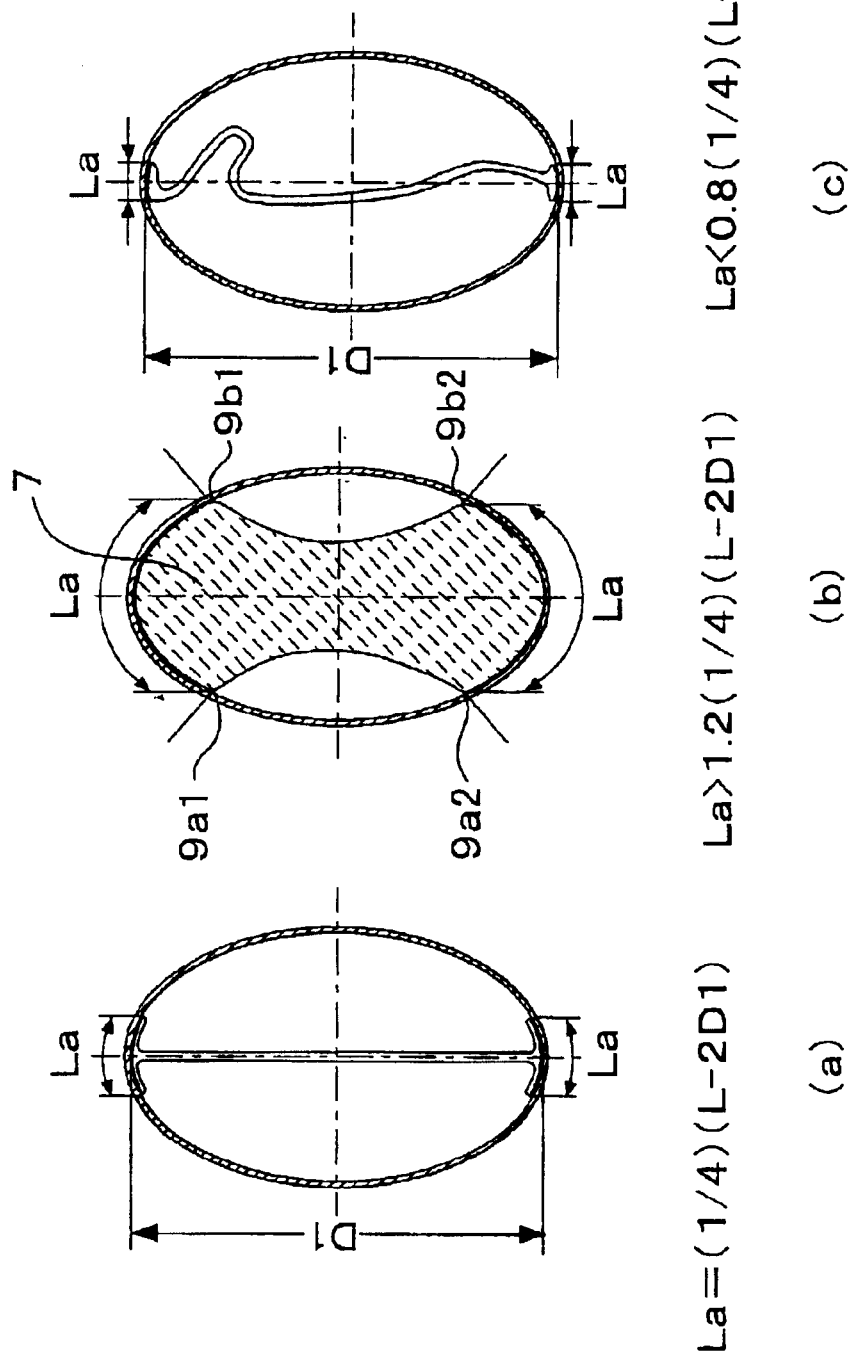
FIG. 7 is explanatory drawings that show how the inner container is deformed when the adhesive resin strips have large, middle, and small widths, as illustrated in the cross-sectional plan view of FIG. 2.
Figure 8:
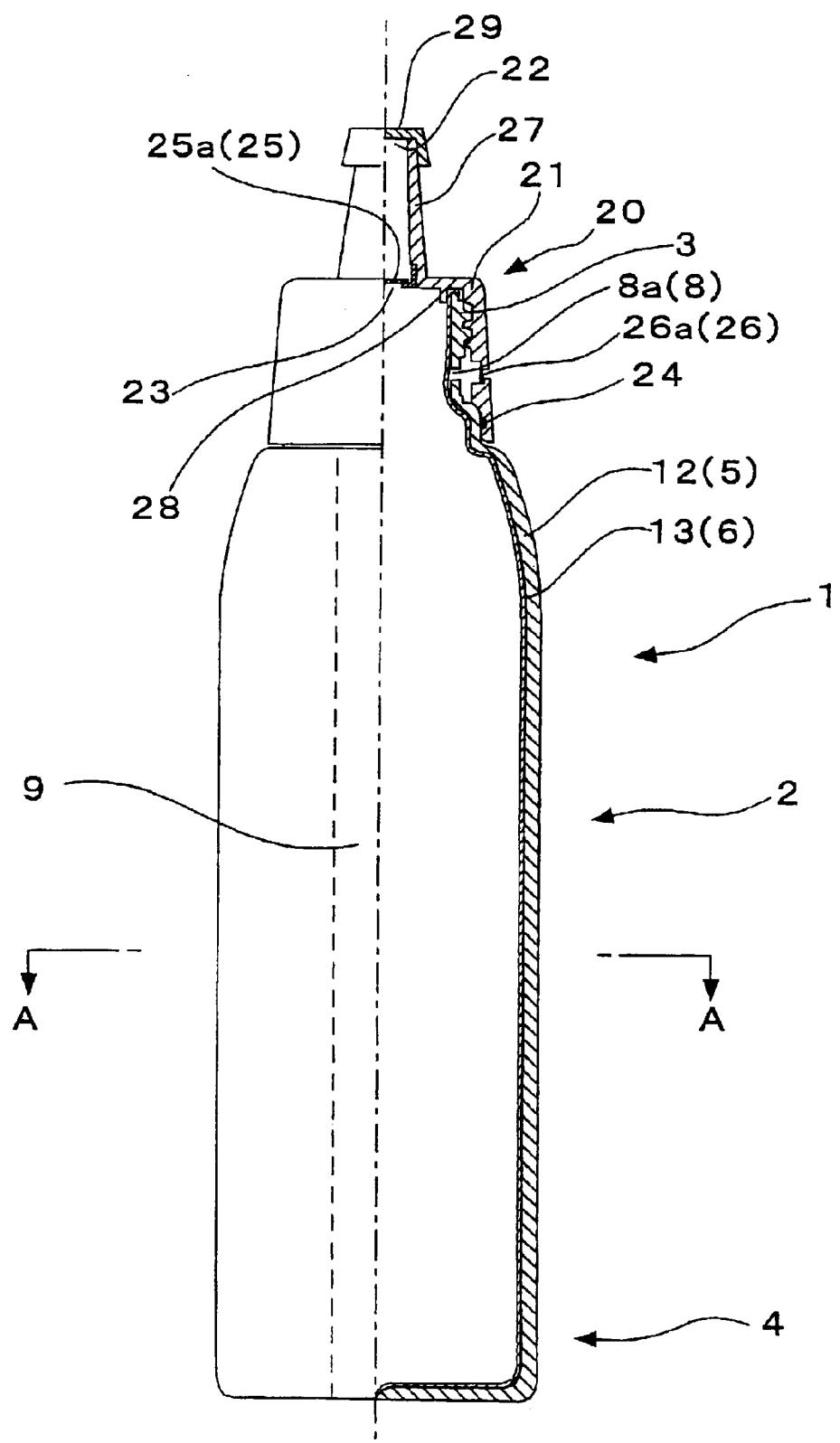
FIG. 8 is a side elevational view showing the pouring vessel in the second embodiment of this invention, with the right half being illustrated in longitudinal section.

FIG. 6 is a cross-sectional plan view of the body 2 of the pouring vessel in the first embodiment of this invention. It is an explanatory drawing that shows the trend in the deformation of the inner container 13 (or the inner layers 6). FIG. 7 includes cross-sectional plan views of the body 2, in which the adhesive resin strips 9 have large, middle, and small widths, La. Each of the drawings also shows a pattern of deformation for the inner container 13 (or the inner layers 6).

The cross-sectional plan view of FIG. 6 shows an ideal progress in the deflationary deformation of the unadhering inner layers 6a and 6b, as observed with the discharge of the content 7. The unadhering inner layers 6a and 6b exist divided in the right and left layers by the adhesive resin strips 9. These layers 6a and 6b start being deflated and deformed from the central parts 6a1 and 6b1 toward each other in the flattening direction. As the deformation proceeds, the layers come in contact on the long axis 10. With further progress in the deflationary deformation, this portion of contact 6c extends along the long axis 10 toward the respective positions of the adhesive resin strips 9.

In this state, the flow paths 7a are secured near the adhesive resin strips 9. When the content 7 is further discharged and little remains in the inner container 13, the portion of contact 6c extends over the entire long axis 10, and the inner container 13 shows an almost completely flattened state, as seen in FIG. 7(a).

If the width, La, of the adhesive resin strips 9 were set at too wide a value, such as La>1.2(¼)(L−2D1), then the deformable portions of unadhering inner layers 6a and 6b would practically disappear because of a dimensional limitation on the length, Lna. In such a case, the unadhering inner layers 6a and 6b on both sides of the adhesive resin strips are so stretched at four strip ends, 9a1, 9a2, 9b1, and 9b2, that it is difficult to deflate and deform these unadhering layers 6a and 6b any more. Under this condition, no matter how the outer container 12 is squeezed with hands, it is hard to discharge the content 7, as seen in FIG. 7(b).

If, on the other hand, the width, La, of the adhesive resin strips 9 were set at too narrow a value, such as La<0.8(¼)(L−2D1), then the cross-sectional length, Lna, of the unadhering inner layers 6a and 6b would become larger than necessary. Even if a considerable amount of content still remains in the entire inner container, there is a fear that the cross-sectional shape of the inner container 13 may almost block the flow path at a place where the content tends to get smaller, depending on the conditions of use, as seen in FIG. 7(c).

FIGS. 8–14 show the second embodiment of the pouring vessel according to this invention. The container 1 comprises an outer shell layer 5 of a low-density polyethylene resin, an inner layer 6 of a nylon resin that has no compatibility with the low-density polyethylene resin, and adhesive resin strips 9 of an adhesive resin that has full adhesiveness with both of the low-density polyethylene and the nylon.

The container 1 has a totally bottle-like shape and comprises the bottom 4, the body 2 having an elliptical cross-section and connected to the bottom 4, and the cylindrical neck 3 disposed on the upper end of the body 2.

The container 1 has a height of 160 mm. The body 2 has an elliptic cross-section, which comprises the long axis with a length of 70 mm and the short axis with a length of 40 mm (See FIG. 9).

The outer shell layer 5 and the inner layer 6, which make up the container 1, are laminated peelably except for the portions adhered and fixed with the adhesive resin strips 9. The outer shell layer 5 forms the outer container 12 having a sufficient mechanical strength and the flexibility to make this container squeezable and recoverable to its original shape. Laid inside the outer container 12, the inner layer 6 forms an inner container 13 that is thin enough to be fully deflated.

Figure 9:
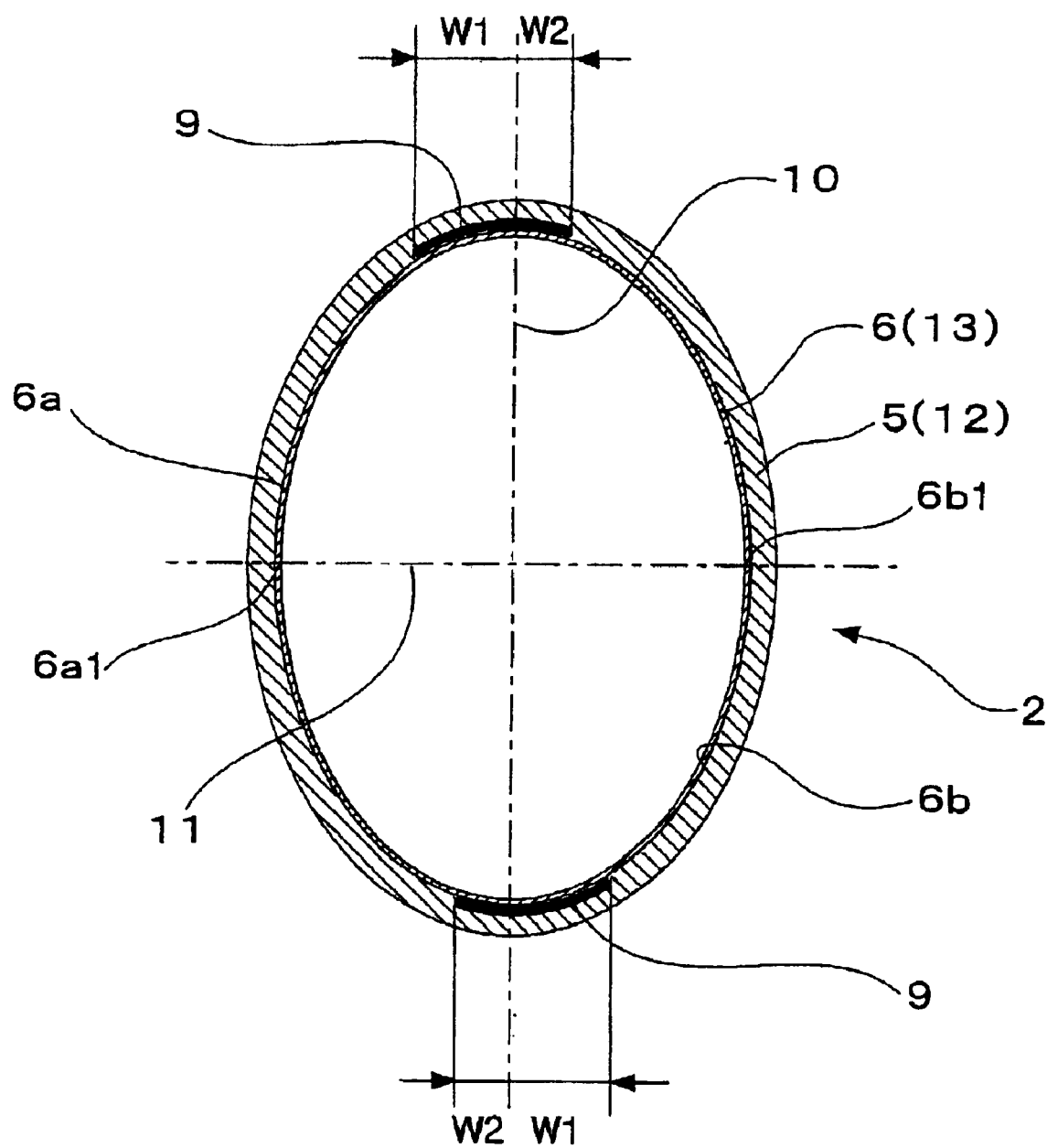
FIG. 9 is a cross-sectional plan view, taken from the line A—A, of the container in the second embodiment shown in FIG. 8.
Figure 10:
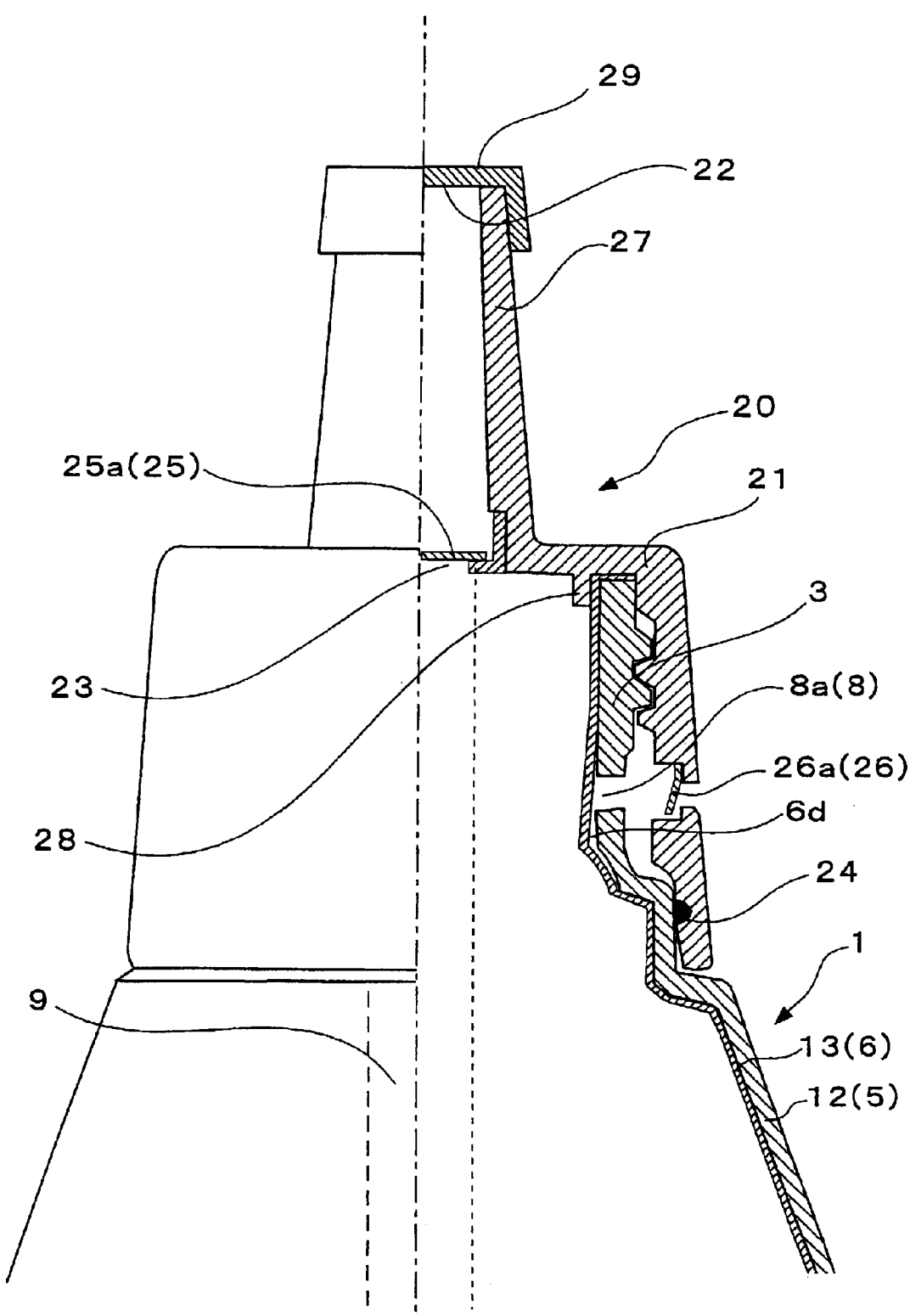
FIG. 10 is a partially enlarged side elevational view showing the second embodiment of FIG. 8, with the right half being illustrated in longitudinal section.

FIG. 9 shows a cross-sectional plan view of the body 2. A pair of adhesive resin strips 9 is disposed at positions opposite to each other at both ends of the assumed long axis 10 in the elliptical cross-section of the body 2, axisymmetrically on the central axis, and extends vertically over the entire height of the container 1, to adhere and fix the outer shell layer 5 and the inner layer 6. Each strip 9 is divided by the long axis 10 into right and left parts having different lengths (W1 and W2) in the width direction. In this embodiment, the entire width of each adhesive resin strip is set at 14 mm, and is divided into the right and left parts (W1 and W2) at a ratio of 10:4.

Figure 11:
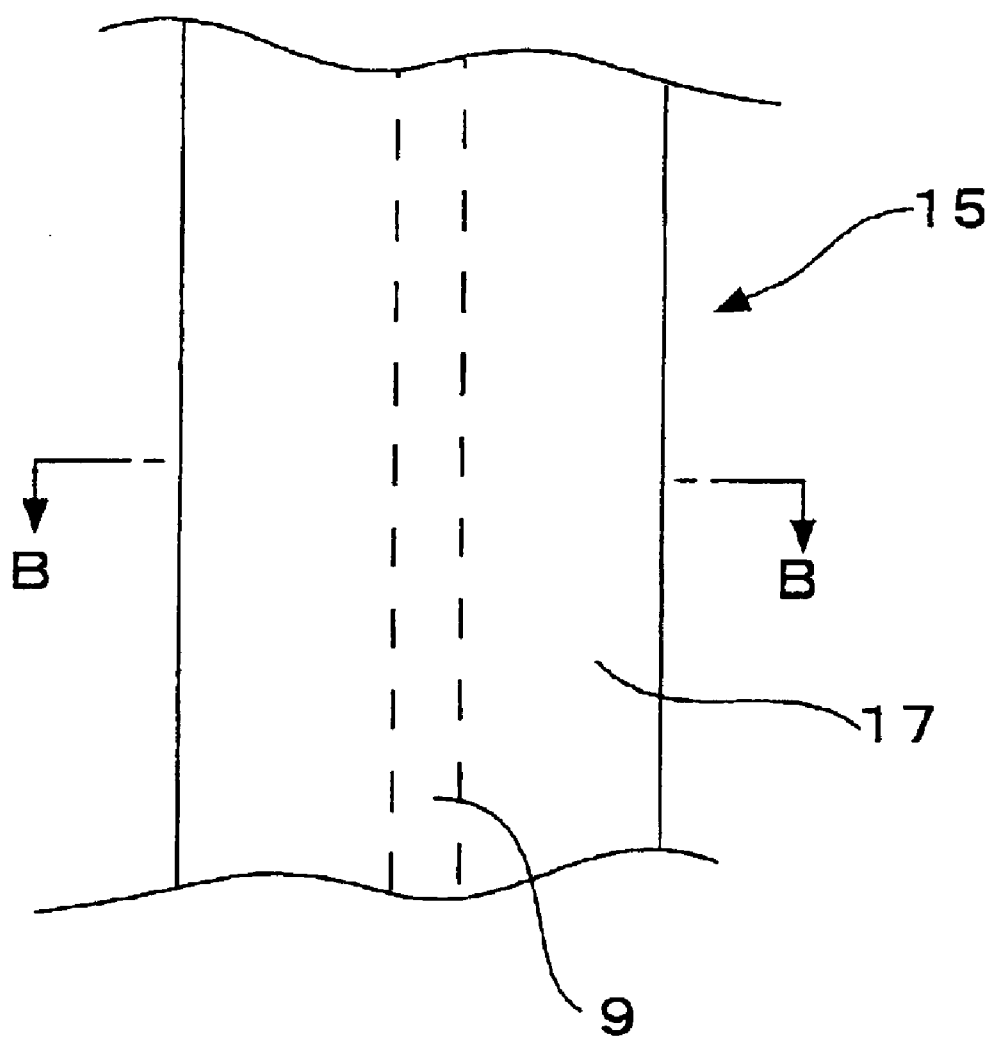
FIG. 11 is a front elevational view showing an example of parison to be blow-molded into the pouring vessel in the second embodiment of this invention.
Figure 12:
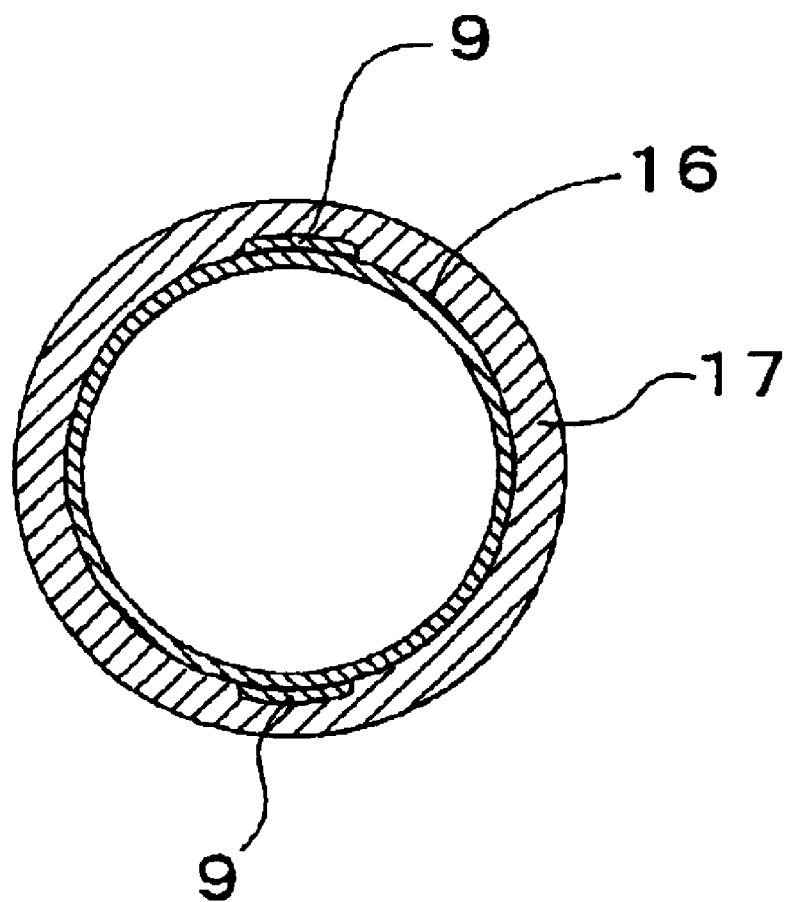
FIG. 12 is a cross-sectional plan view, taken from the line B—B, of an example of parison shown in FIG. 11.

As shown in FIGS. 11 and 12, parison 15 is first molded by extruding together an outer cylinder 17, an inner cylinder 16 located inside the outer cylinder 17, and a pair of adhesive resin strips 9 positioned axisymmetrically on the central axis, with each strip 9 being sandwiched between the outer cylinder 17 and the inner cylinder 16. This parison 15 is then blow-molded into the container 1, by using a mold for blow molding.

The cylindrical neck 3 has screw thread notched on the outer wall and is provided with a pair of air introduction ports 8a as a part of the air introduction mechanism 8. These ports 8a are disposed axisymmetrically on the central axis of the body 2 at positions of 90 degrees from the adhesive resin strips 9 (See FIG. 10).

The discharge cap 20 comprises a main cap portion 21 and a discharge cylinder 27. The main cap portion 21 has a top surface through which an opening 23 is provided at the center and has screw thread notched on the inner wall to screw together with the neck 3 of the container 1. The discharge cylinder 27 is disposed on the top surface of the main cap portion 21, and stands upright on the edge of the opening 23. The content is discharged outside from the discharge port 22 at the upper end of the discharge cylinder 27. Cover cap 29 covers the discharge port 22.

The discharge cap 20 is screwed on the neck 3 of the container 1. It comprises a seal guide 28, which hangs down from under the top surface of the main cap portion 21, and also a sealing portion 24, which is disposed at the lower end of the inner wall of the main cap portion 21. The discharge cap 20 seals the tight fitting around the container 1 as the seal guide 28 and the sealing portion 24 are in tight contact with the upper end of the inner wall and the lower end of the outer wall, respectively, of the neck 3 of the container 1.

The discharge cap 20 is provided with the first check valve mechanism 25 including the first check valve 25a. This valve usually has a checking function to close the opening 23 and to prevent outside air from coming in the inner container 13. When the container 1 is squeezed to discharge the content 7, the valve acts to open the opening 23 due to the inner pressure of the inner container 13.

In addition, the discharge cap 20 is provided with the second check valve mechanism 26 comprising the second check valve 26a at places opposite to the air introduction ports 8a disposed in the neck 3. This second check valve 26a has a function to open the ports 8a and introduce air into the void 6d between the outer shell layer 5 and the inner layer 6 through the air introduction ports 8a if the air in the void 6d between the outer container 12 and the inner container 13 has a lower pressure than outside air. On the other hand, if the air in the void 6d has a pressure equal to, or higher than, the outside air pressure, the check valve 26a performs the check function to close the ports 8a and prevent air from escaping outside.

The pouring vessel in the above-described embodiment of this invention is further described for its state of use, while referring to the drawings. When the pouring vessel in the above-described configuration is used, the body 2 of the container 1 is squeezed at first, and the second check valve 26a is kept in the closed state during this squeeze. The pressure rises in the inner container 13, and opens the first check valve 25a that has been in the closed state. As a result, the content 7 is discharged outside through the discharge port 22 at the tip of discharge cap 20. The inner container 13 deflates and deforms in response to a decrease in the volume of the content 7.

Then, when the squeeze of the body 2 is stopped to release the pressure applied onto the inner container 1, the outer container 12 begins restoring its original shape because of its resilient, restoring force, and the air in the void between the outer container 12 and the inner container 13 has a reduced pressure. As a result, the pressure inside the inner container 13 returns to atmospheric pressure, and the first check valve 25a closes, thus allowing the discharge of the content 7 to come to a halt. The inner container 13 remains deflated. Then, the second check valve 26a opens, and outside air is sucked into the void 6d between the outer shell layer 5 and the inner layer 6 through the air introduction ports 8a. The outer container 12 is restored to its original shape, while letting the detachment proceeds between these layers until the air between the outer container 12 and the inner container 13 has a pressure equal to outside air pressure. With the completion of this suction, the second check valve 26a closes.

When the container 1 is squeezed again, the increased pressure caused by the squeeze is transmitted to the inner container by way of air between the outer container 12 and the inner container 13 since the second check valve 26a remains closed. Then, the pressure rises within the inner container 13, the first check valve 25a opens, and the content 7 is discharged from the discharge port 22. The inner container 13 is further deflated with the decrease in the volume of the content 7.

Each time when the squeeze of the container 1 is stopped to release the pressure applied onto the body 2 of the container 1, a similar process takes place as described above. A new round of the above-described operation is ready to be repeated. The content 7 is thus discharged again and again by repeating the squeeze operations. Eventually, almost entire volume is discharged except for quite a small volume remaining in the inner container 13.

Figure 13:
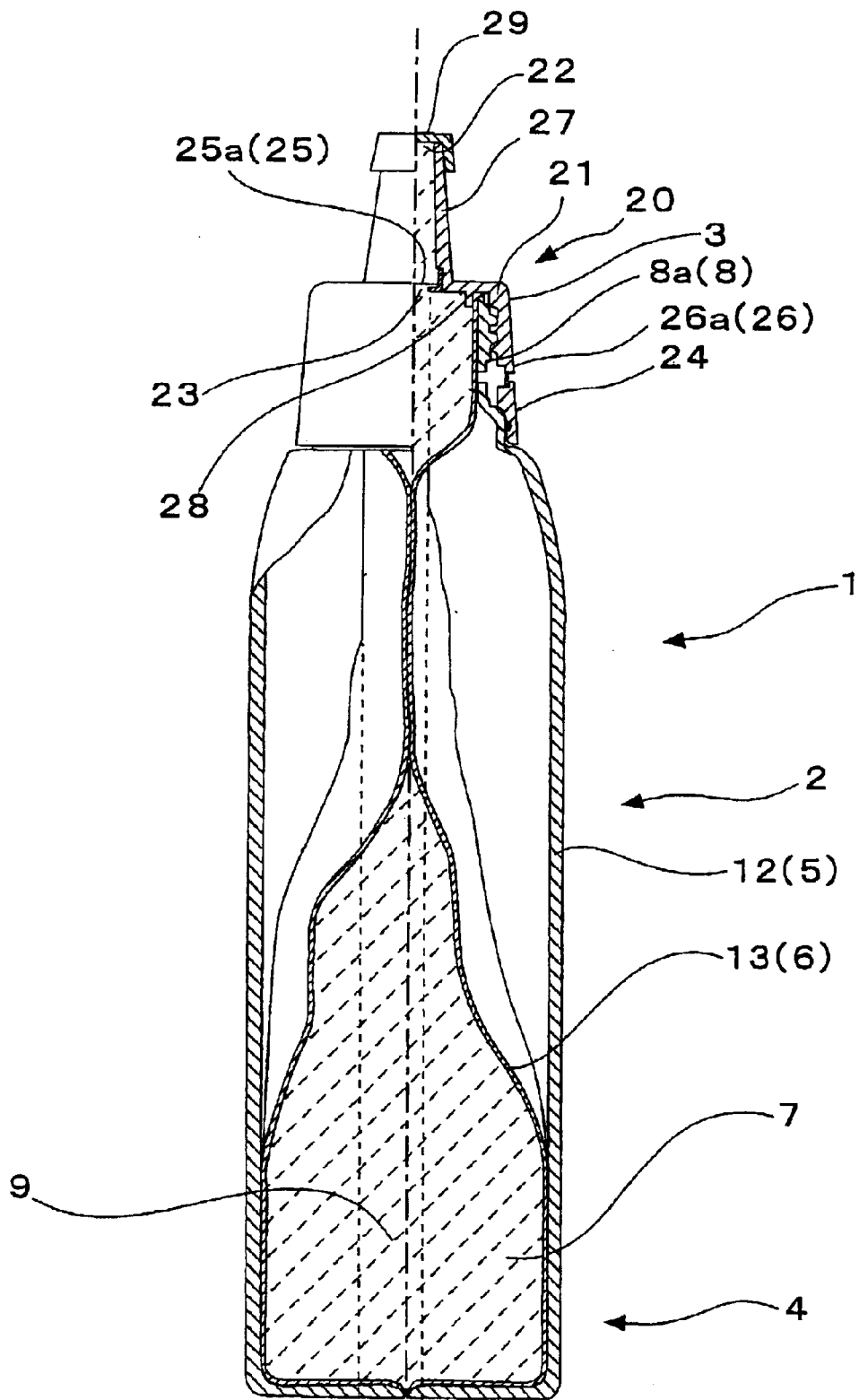
FIG. 13 is an explanatory drawing of the pouring vessel in the second embodiment of this invention, with partial longitudinal section illustrating the deflationary deformation of the inner container.

FIG. 13 is an explanatory drawing of the pouring vessel in the second embodiment of this invention, with partial longitudinal section illustrating the deflationary deformation of the inner container 13. Since the outer container 12 and the inner container 13 are adhered to each other by the adhesive resin strips 9, the inner container 13 shows no shrinking deformation in the height direction. The content 7 stays in the lower portion because of its weight, and the deflationary deformation takes place mainly in the upper portion.

Figure 14:
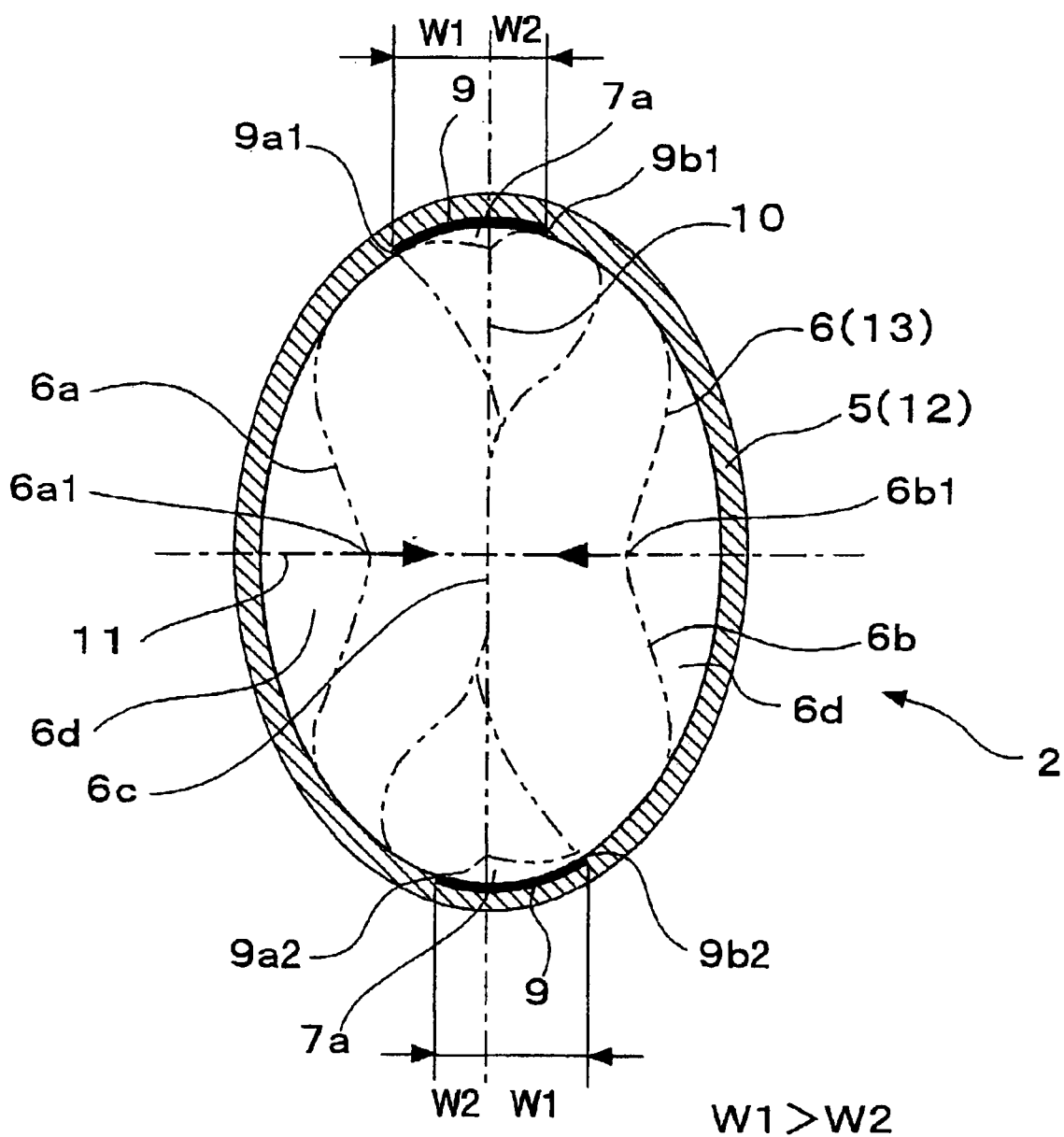
FIG. 14 is an explanatory drawing showing the trend in the deformation of the inner container in the second embodiment of the pouring vessel of this invention, as illustrated in the cross-sectional plan view of FIG. 9.

FIG. 14 is a cross-sectional plan view of the body 2 of the pouring vessel in the second embodiment of this invention. It is an explanatory drawing that shows the trend in the deformation of the inner container 13 (or the inner layers 6).

Figure 15:
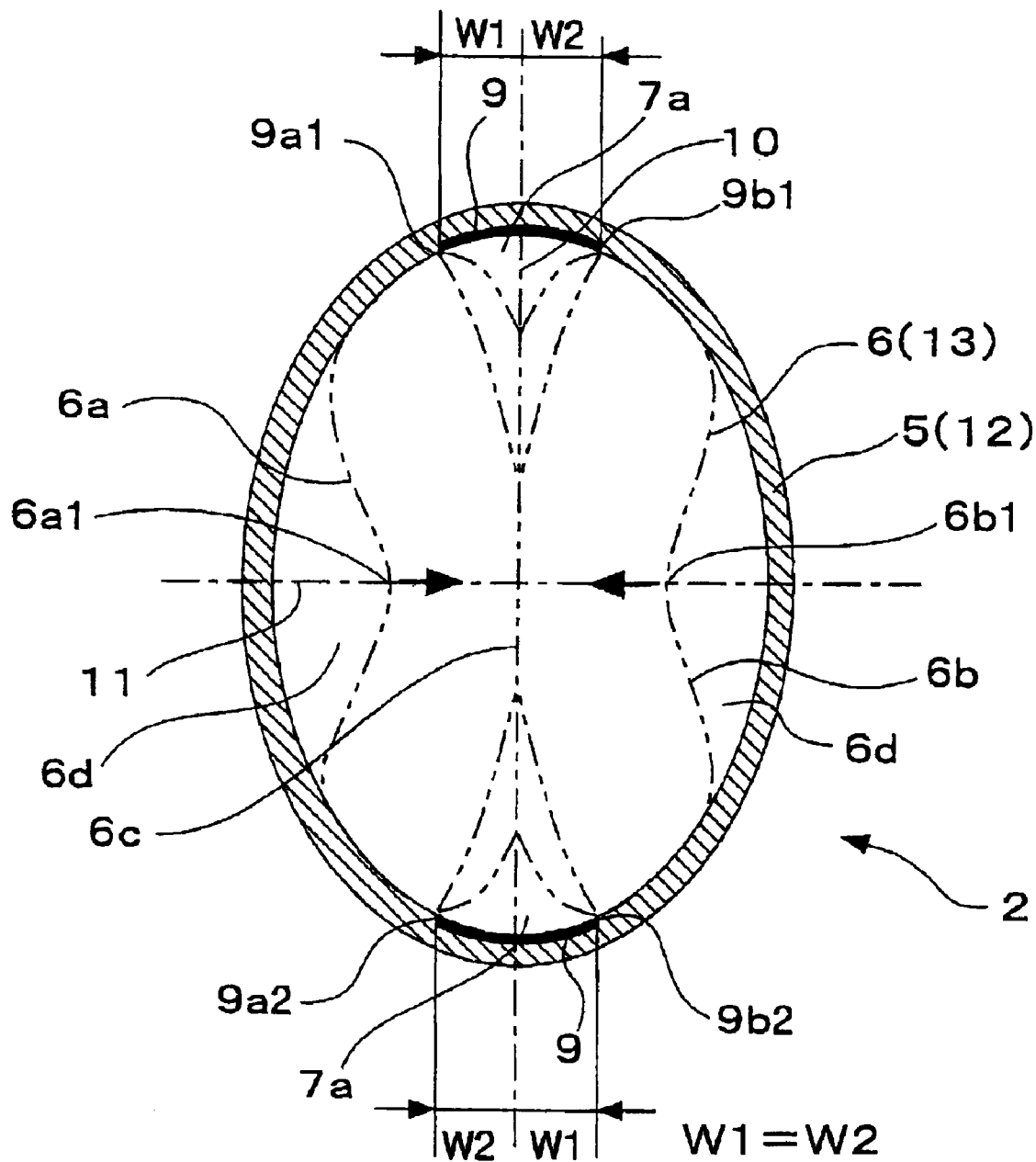
FIG. 15 is also an explanatory drawing showing the trend in the deformation of the inner container in a example compared to the second embodiment of the pouring vessel of this invention.

FIG. 15 is cross-sectional plan view of the body 2 similar to FIG. 14, but in this comparative example, the adhesive resin strips 9 are disposed symmetrically on the long axis 10 of the ellipse, i.e., at positions where W1=W2. It is an explanatory drawing showing the trend in the deformation of the inner container 13 (or the inner layers 6). Except for the positions of these adhesive resin strips 9, other parts of the configuration are similar to the second embodiment of this invention.

The unadhering inner layers 6a and 6b exist divided in the right and left layers by the adhesive resin strips 9. These layers 6a and 6b start being deflated and deformed from the central parts 6a1 and 6b1 toward each other in the flattening direction. As the deformation proceeds, the layers come in contact on the long axis 10 to form a portion of contact 6c. When the content 7 is further discharged and the inner container 13 is continuously deflated and deformed, this portion of contact 6c extends along the long axis 10 toward the respective positions of the adhesive resin strips 9.

As the content 7 is further discharged and the inner container 13 continues its deflationary deformation, there remains little deformable portion because of a dimensional limitation on the unadhering inner layers 6a and 6b. In the comparative example, the unadhering inner layers 6a and 6b on both sides of the adhesive resin strips 9 are so stretched at four strip ends, 9a1, 9a2, 9b1, and 9b2, that it is difficult to deflate and deform these unadhering layers 6a and 6b any more. Under this condition, no matter how the outer container 12 is squeezed with hands, it is hard to discharge the content 7, as seen in FIG. 15.

On the other hand, if the adhesive resin strips 9 are disposed asymmetrically, as in the second embodiment of this invention, asymmetry in the right and left parts of the unadhering inner layers 6a and 6b becomes marked near the four strip ends, 9a1, 9a2, 9b1, and 9b2, of the adhesive resin strips 9 with the progress in the deformation.

The deformable portion practically disappears because of a dimensional limitation on the cross-sectional length of the unadhering inner layers 6a and 6b near the strip ends, 9a1 and 9b2, on the sides of longer parts (the W1 sides) of the adhesive resin strips 9 divided by the long axis. The pressure caused by the squeeze is held at these ends. On the other hand, there still is dimensional extra space near the strip ends, 9a2 and 9b1, on the sides of the shorter parts (the W2 sides) of the adhering inner layers 6a and 6b. Because of this asymmetry, the squeeze operation allows for further deformation with the decrease in the volume of the content. As a result, the remaining content can be minimized to a large extent (See FIG. 14).

If the width of the adhesive resin strips 9 can be set at a proper level, it is possible to secure the flow path 7a over the entire height of the pouring vessel until the content 7 is discharged to the limit.

EFFECTS OF THE INVENTION

This invention in the above-described configuration has the following effects:

The pouring vessel of squeezable type in the invention of claims 1 and 2 allows for smooth discharge operation to the last moment of squeeze untill little content to remain in the inner container after use by setting the width of the adhesive resin strips at a proper range, wherein said adhesive resin strips are disposed to control the form of the inner container in the direction of height at the time of deflationary deformation and to secure the flow path for the content.

The pouring vessel of squeezable type having an elliptic body in the invention of claims 3 to 5 allows for smooth discharge operation to the last moment of squeeze untill little content to remain in the inner container after use, by setting the width of the adhesive resin strips in such a way that each strip is divided by the assumed long axis into the right and left parts having different lengths in the width direction, wherein said adhesive resin strips are disposed to control the form of the inner container in the direction of height at the time of deflationary deformation and to secure the flow path for the content.

What is claimed is:

1. A pouring vessel comprising:
    a blow-molded, bottle-like container (1) consisting of an outer shell layer (5) and an inner layer(S), which are peelably laminated together, and having a body (2) of a cross-sectional shape in which an assumed symmetrical long axis (10) and a symmetrical short axis (11) are orthogonal with each other, said outer shell layer (6) forming an outer container (12), which has the flexibility to make this container squeezable and recoverable to its original shape, and said inner layer (6) forming an inner container (13) for receiving its content (7) inside and capable of being deflated avid deformed inward with the decrease in inner pressure; and a discharge cap (20) having an opening (23) and attached to neck (3) or the container (1);

wherein a pair of vertical adhesive resin strips (9) is formed at both ends of the long axis (10) of the body (2), axisymmetrically on the central axis, by adhering the outer shell layer (6) and the inner layer (6) over the roughly entire height of the container (1), with the width (La) of said adhesive resin strips (9) being set in the range of 0.8(¼)(L−2D1) to 1.2(¼)(L−2D1), preferably at (¼)(L−2D1), wherein D1 is the length of the long axis in the cross-section of the body (2); and L is the peripheral length in the cross-section of body (2);

wherein said discharge cap (20) is provided with the first check valve mechanism (25) that prevents the back flow of the content (7) from the opening (23) to the inner container (13) and also prevents the inflow of outside air; and wherein die outer container (12) is equipped with on outside air introduction mechanism (8) for introducing outside air into the interlaminar void (64) between the outer shell layer (5) and the inner layer (6), with the outside air introduction mechanism (8) being connected to the second check valve mechanism (26), which has a function to confine air within the void (64) at the time of squeeze.

2. The pouring vessel according to claim 1, wherein the crone-section of the body (2) has a circular shape when the length of the long axis is made equal to the length of the short axis.

3. A pouring vessel comprising:
    a blow-molded, bottle-like container (1) consisting of an outer shell layer (5) and an inner layer (6), which are peelably laminated together, and having a body (2) of a cross-sectional shape in which an assumed symmetrical long axis (10) and a symmetrical short axis (11) are orthogonal with each other, said outer shell layer (5) forming an outer container (12), which has the flexibility to make thin container squeezable and recoverable to it original shape, and said inner layer (6) forming an inner container (13) for receiving its content (7) inside and capable of being deflated and deformed inward with the decrease in inner pressure; and a discharge cap (20) having an opening (28) and attached to neck (3) of the container (1);

wherein a pair of vertical adhesive resin strips (9) is formed at both ends of the lung axis (10) of the body (2) axisymmetrically on the central axis, by adhering the outer shell layer (5) and the inner layer (6) over the roughly entire height of the container (1), with each strip (9) being divided by the long axis (10) into right and left parts having different lengths in the width direction;

wherein said discharge cap (20) is provided at the opening (23) with the first check valve mechanism (25) that prevents the beck flow of the content (7) to the inner container (13) and also prevents the inflow of outside air; and wherein the outer container (12) is equipped with an outside air introduction mechanism (8) for introducing outside air into the interlaminar void (64) between the outer shell layer (6) and the inner layer (6), with the outside air introduction mechanism (8) being connected to the second check valve mechanism (26), which has a function to confine air within the void (64) at the time of squeeze.

4. The pouring vessel according to claim 3, wherein the body (2) has an elliptic shape in the cross-sectional plan view.

5. The pouring vessel according to claim 3, wherein each strip (9) is divided by the long axis (10) into the right and left parts having different widths (W1 and W2) at a ratio in the range of 10:1 to 10:6.

6. The pouring vessel according to claim 4, wherein each strip (9) is divided by the long axis (10) into the right and left parts having different widths (W1 and W2) at a ratio in the range of 10:1 to 10:6.

* * * * *

UNITED STATES PATENT AND TRADEMARK OFFICE
CERTIFICATE OF CORRECTION

PATENT NO. : 6,742,676 B2
DATED : June 1, 2004
INVENTOR(S) : Hiroyuki Nakamura et al.

It is certified that error appears in the above-identified patent and that said Letters Patent is hereby corrected as shown below:

Column 13,
Line 27, "(S)" is replaced with -- (6) --;
Line 31, "(6)" is replaced with -- (5) --;
Line 36, "avid" is replaced with -- and --;
Line 43, "(6)", first occurrence, is replaced with -- (5) --;
Line 56, "die" is replaced with --the --;
Line 56, "on" is replaced with -- an --;
Line 58, "(64)" is replaced with -- (6d) --;

Column 14,
Lines 3 and 43, "(64)" is replaced with -- (6d) --;
Line 6, "crone" is replaced with -- cross --;
Line 17, "thin" is replaced with -- this --;
Line 25, "lung" is replaced with -- long --;
Line 26, "(2)" is replaced with -- (2), --;
Line 34, "beck" is replaced with -- back --;
Line 39, "(64)" is replaced with -- (6d) --;
Line 40, "(6)", first occurrence, is replaced with -- (5) --; and Signed and Sealed this Seventh Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,742,676 B2
DATED : June 1, 2004
INVENTOR(S) : Hiroyuki Nakamura et al.

It is certified that error appears in the above-identified patent and that said Letters Patent is hereby corrected as shown below:

Column 13,
Line 27, "(S)" is replaced with -- (6) --;
Line 31, "(6)" is replaced with -- (5) --;
Line 36, "avid" is replaced with -- and --;
Line 43, "(6)", first occurrence, is replaced with -- (5) --;
Line 56, "die" is replaced with --the --;
Line 56, "on" is replaced with -- an --;
Line 58, "(64)" is replaced with -- (6d) --;

Column 14,
Lines 3 and 43, "(64)" is replaced with -- (6d) --;
Line 6, "crone" is replaced with -- cross --;
Line 17, "thin" is replaced with -- this --;
Line 25, "lung" is replaced with -- long --;
Line 26, "(2)" is replaced with -- (2), --;
Line 34, "beck" is replaced with -- back --;
Line 39, "(64)" is replaced with -- (6d) --;
Line 40, "(6)", first occurrence, is replaced with -- (5) --; and
Line 43, "(64)" is replaced with -- (6d) --.

This certificate supersedes Certificate of Correction issued December 7, 2004.

Signed and Sealed this

Twenty-sixth Day of April, 2005

JON W. DUDAS
*Director of the United States Patent and Trademark Office*